US012689406B2

(12) United States Patent
Syngg et al.

(10) Patent No.: US 12,689,406 B2
(45) Date of Patent: Jul. 21, 2026

(54) ELECTRICAL FILTER TOPOLOGY

(71) Applicant: Telefonaktiebolaget LM Ericsson (publ), Stockholm (SE)

(72) Inventors: Göran Syngg, Partille (SE); Daniel Sjöberg, Mölndal (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 312 days.

(21) Appl. No.: 18/574,510

(22) PCT Filed: Jul. 8, 2021

(86) PCT No.: PCT/SE2021/050704
§ 371 (c)(1),
(2) Date: Dec. 27, 2023

(87) PCT Pub. No.: WO2023/282808
PCT Pub. Date: Jan. 12, 2023

(65) Prior Publication Data
US 2024/0322856 A1    Sep. 26, 2024

(51) Int. Cl.
H04B 1/54 (2006.01)
H01P 1/383 (2006.01)

(52) U.S. Cl.
CPC ............... H04B 1/54 (2013.01); H01P 1/383 (2013.01)

(58) Field of Classification Search
CPC ... H01B 1/38; H01B 1/40; H01B 1/52; H01B 1/525; H01B 1/54; H01B 1/56;
(Continued)

(56) References Cited

U.S. PATENT DOCUMENTS

| | | | | |
|---|---|---|---|---|
| 7,248,839 | B2 * | 7/2007 | Luy | H01P 1/213 |
| | | | | 343/702 |
| 9,154,178 | B2 * | 10/2015 | Lee | H03H 9/725 |

(Continued)

FOREIGN PATENT DOCUMENTS

| | | |
|---|---|---|
| GB | 1079285 A | 8/1967 |
| WO | 9810525 A1 | 3/1998 |

(Continued)

OTHER PUBLICATIONS

"Non-Reciprocal Circuit Element And High-Frequency Module", WO 2015156056 A1, Kusumoto et al., Oct. 15, 2015 (English Text). (Year: 2015).*

(Continued)

*Primary Examiner* — Quochien B Vuong
(74) *Attorney, Agent, or Firm* — Sage Patent Group

(57) ABSTRACT

The present disclosure relates to an electrical filter arrangement including a transmitter port, a receiver port and an antenna port. The electrical filter arrangement further includes a transmitter filter connected to the first transmitter port and a receiver filter connected to the receiver port. The electrical filter arrangement further includes a four-port circulator device that is connected between the filters, the antenna port, and a termination impedance that is connected to ground. The circulator device is adapted to admit signals to pass from the transmitter filter to the antenna port, from the antenna port to the receiver filter, and from the receiver filter to the termination impedance.

10 Claims, 4 Drawing Sheets

(58) Field of Classification Search

CPC ......... H01B 1/58; H01B 1/0053; H01P 1/213; H01P 1/36; H01P 1/38; H01P 1/383; H03H 7/00; H03H 7/38; H03H 7/461; H03H 7/463; H03H 7/48; H03H 7/482; H03H 9/706; H03H 9/725

See application file for complete search history.

(56) References Cited

U.S. PATENT DOCUMENTS

| | | | |
|---|---|---|---|
| 9,246,202 B1 * | 1/2016 | Barker ...................... H01P 1/38 |
| 2016/0149283 A1 | 5/2016 | Shen et al. | |
| 2017/0179998 A1 * | 6/2017 | Onaka ...................... H04B 1/52 |
| 2019/0036190 A1 | 1/2019 | Feng et al. | |
| 2019/0036194 A1 | 1/2019 | Shen et al. | |
| 2020/0177228 A1 | 6/2020 | Furakawa | |

FOREIGN PATENT DOCUMENTS

| | | |
|---|---|---|
| WO | 2015156056 A1 | 10/2015 |
| WO | 2016201330 A1 | 12/2016 |

OTHER PUBLICATIONS

International Search Report and Written Opinion of the International Searching Authority, PCT/SE2021/050704, mailed Mar. 16, 2022, 11 pages.

Extended European Search Report for European Patent Application No. 21949467.1 dated Feb. 5, 2025, 10 pages.

Navarrini, Alessandro et al., "Backward Couplers Waveguide Orthomode Transducer for 84-116 GHZ," Proceedings of the 19th International Symposium on Space Terahertz Technology, ISSTT 2008, Groningen, Apr. 28, 2008, pp. 358-367.

* cited by examiner

ELECTRICAL FILTER TOPOLOGY

CROSS REFERENCE TO RELATED APPLICATIONS

This application is a 35 U.S.C. § 371 national stage application of PCT International Application No. PCT/SE2021/050704 filed on Jul. 8, 2021, the disclosure and content of which is incorporated by reference herein in its entirety.

TECHNICAL FIELD

The present disclosure relates to an electrical filter arrangement, such as a microwave filter arrangement, comprising a transmitter port, a receiver port and an antenna port.

BACKGROUND

So-called multi-carrier solutions can be used to enable an increased amount of data to be transferred in a combination with higher total bandwidths. Another reason for using multi-carrier solutions is to minimize number of visible antennas both in urban and suburban areas. There is also an associated cost that increases the more hardware that is needed at each site, for example rent and installation cost.

A common solution today is to use a directional coupler and connect different radio modules to one antenna. As illustrated in prior art FIG. 1, two radio modules P1, P2 are connected to a common directional coupler P3, where the common directional coupler P3 in turn is connected to an antenna P4 via an antenna port P5. Each radio module P1, P2 comprises a transmitter module Tx1, Tx2, a transmitter filter P6, P7, a receiver module Rx1, Rx2, and a receiver filter P8, P9 which are combined via a T-junction P10, P11. In a full duplex radio, the transmit frequency and receive frequency will be slightly different, for example 26500 MHz and 27500 MHZ, where the filters P6, P7, P8, P9 are band-pass filters with a pass-band around the receive frequency and transmit frequency, respectively. The T-junctions P10, P11 are matched together with the band-pass filters P6, P7, P8, P9 to achieve a low loss connection and good matching.

For each radio module P1, P2, the match seen from a receiver module Rx1, Rx2 will be relatively good in the pass-band of each receiver filter P8, P9 in the same way the match as seen from a transmitter module Tx1, Tx2 will be relatively good in the pass-band of each transmitter filter P6, P7. Outside the pass-bands, the match will be relatively poor with a relatively low return loss, for example in the order of 0.5 dB to 1 dB.

When combing the radio modules P1, P2 with the directional coupler P3, the matching will be limited by the coupling factor. In most cases the coupling is 3 dB since that makes the combination equal, otherwise one radio will be suppressed. An equal coupling of 3 dB in the directional coupler P3 will theoretically provide a return loss of about 6 dB.

Generally, a microwave filter arrangement can be constituted by an electrical filter arrangement.

It is therefore desired to provide an electrical filter arrangement that enables enhanced matching and return loss.

SUMMARY

It is an object of the present disclosure to provide an electrical filter arrangement that enables enhanced matching and return loss.

This object is obtained by means of an electrical filter arrangement comprising a transmitter port, a receiver port and an antenna port. The electrical filter arrangement further comprises a transmitter filter connected to the first transmitter port and a receiver filter connected to the receiver port. The electrical filter arrangement further comprises a four-port circulator device that is connected between the filters, the antenna port, and a termination impedance that is connected to ground. The circulator device is adapted to admit signals to pass from the transmitter filter to the antenna port, from the antenna port to the receiver filter, and from the receiver filter to the termination impedance.

In this way, an improved matching is provided, taking care of reflected signal parts by means of the termination impedance. The return loss seen from the antenna port will always be good for a wide frequency band, and therefore the ripple in power at both the transmitter port and the receiver port will be reduced. As the ripple is reduced, the signal quality will improve as the distortion cause on the signal due to slopes will be reduced According to some aspects, the circulator device comprises a first circulator port that is connected to the termination impedance, a second circulator port that is connected to the transmitter filter, a third circulator port that is connected to the receiver filter, and a fourth circulator port that is connected to the antenna port. Signals input at the second circulator port mainly pass only via the fourth circulator port, signals input at the fourth circulator port mainly pass only via the third circulator port, and signals input at the third circulator port mainly pass only via the first circulator port.

In this way, an improved matching is provided, taking care of reflected signal parts by means of the termination impedance. The return loss seen from the antenna port will always be good for a wide frequency band, and therefore the ripple in power at both the transmitter port and the receiver port will be reduced. As the ripple is reduced, the signal quality will improve as the distortion cause on the signal due to slopes will be reduced According to some aspects, the electrical filter arrangement comprises a first isolator device connected between the transmitter port and the circulator device, and a second isolator device connected between the receiver port and the circulator device. The first isolator device is adapted to enable signals to mainly pass only towards the circulator device, and the second isolator device is adapted to enable signals to mainly pass only towards the receiver port.

The isolators will provide an enhanced return loss and a reduced insertion loss over the full waveguide bandwidth.

This object is also obtained by means of total electrical filter arrangements, microwave link transceiver arrangements and methods associated with the above advantages.

BRIEF DESCRIPTION OF THE DRAWINGS

The present disclosure will now be described more in detail with reference to the appended drawings, where.

DETAILED DESCRIPTION

Figure 1:
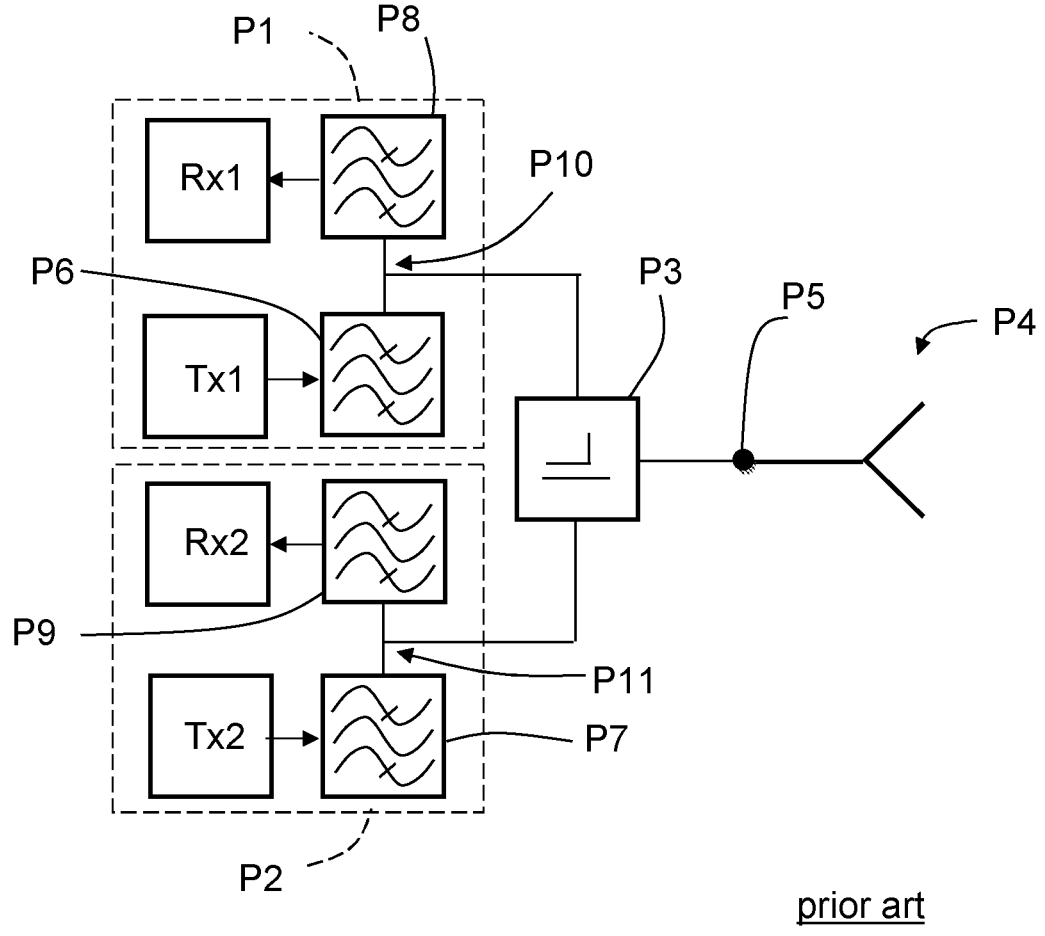
FIG. 1 schematically shows radio modules connected to an antenna according to prior art.

Aspects of the present disclosure will now be described more fully hereinafter with reference to the accompanying drawings. The different devices, systems, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

Figures 2, 3:
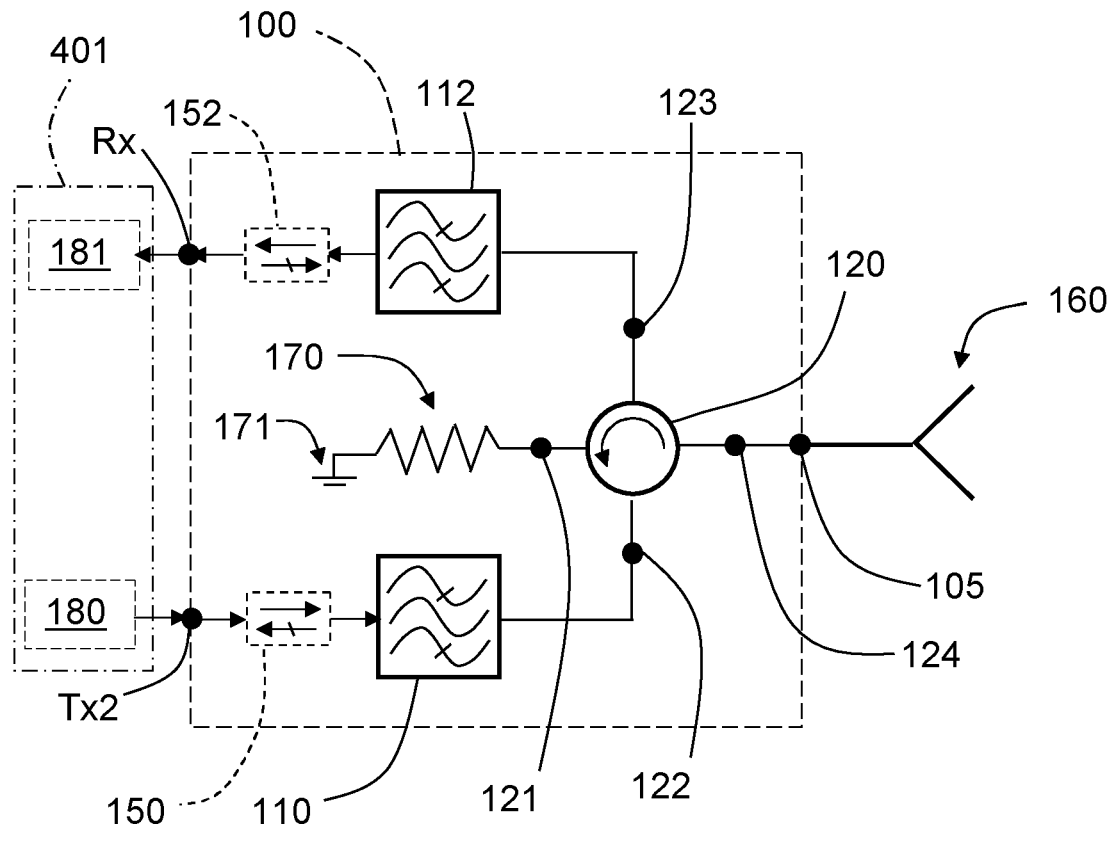
FIG. 2 schematically shows a first example of a microwave filter arrangement.
FIG. 3 schematically shows an arrangement with two microwave filter arrangements according to FIG. 2.

With reference to FIG. 2, there is a microwave filter arrangement 100 that comprises a transmitter port Tx, a receiver port Rx and an antenna port 105. The microwave filter arrangement 100 further comprises a transmitter filter 110 connected to the transmitter port Tx and a receiver filter 112 connected to the receiver port Rx. The transmitter port Tx is adapted to be connected to a transmitter device 180 and the receiver port Rx is adapted to be connected to a receiver device 181. The transmitter device 180 and the receiver device 181 are all comprised in a radio unit 401, such as for example a TRX device. Although not illustrated, the radio unit 401 can be connected to the other examples of filter arrangements as well.

According to the present disclosure, the microwave filter arrangement 100 comprises a four-port circulator device 120 that is connected between the filters 110, 112, the antenna port 105, and a termination impedance 170 that is connected to ground 171. According to some aspects, the termination impedance 170 is a matched impedance, such as for example a 5052 resistor. The circulator device 120 is adapted to admit signals to pass from the transmitter filter 110 to the antenna port 105, from the antenna port 105 to the receiver filter 112, and from the receiver filter 112 to the termination impedance 170.

According to some aspects, the antenna port 105 is connected to an antenna device 160.

The circulator device 120 comprises a first circulator port 121 that is connected to the termination impedance 170, a second circulator port 122 that is connected to the transmitter filter 110, a third circulator port 123 that is connected to the receiver filter 112 and a fourth circulator port 124 that is connected to the antenna port 105. Signals input at the second circulator port 122 mainly pass only via the fourth circulator port 124, and signals input at the fourth circulator port 124 mainly pass only via the third circulator port 123 and signals input at the third circulator port 123 mainly pass only via the first circulator port 121.

According to some aspects, in practice this means that for a signal to be transmitted, a Tx signal, almost all parts of the Tx signal input at the second circulator port 122 are intended to pass via the fourth circulator port 124 and the antenna port 105 such that it can be radiated by the antenna device 160. However, the relatively small part of the Tx signal that is reflected at the fourth circulator port 124, and the antenna port 105, is circulated further to the third circulator port 123, where a main part of the reflected Tx signal is rejected due to the receiver filter 112. The remaining reflected Tx signal is circulated further to the first circulator port 121 where the remaining reflected Tx signal is terminated by means of the termination impedance 170. This means that a very small, probably negligible part, of an original Tx signal is circulated back to the second circulator port 122.

Correspondingly, according to some further aspects, in practice this also means that for a received signal, an Rx signal, almost all parts of the Rx signal received by the antenna device 160 passes to the receiver filter 112 via the antenna port 105, the fourth circulator port 124 and the third circulator port 123. However, the relatively small part of the Rx signal that is reflected at the third circulator port 123 is circulated further to the first circulator port 121 where the remaining reflected Tx signal is terminated by means of the termination impedance 170. This means that a very small, probably negligible part, of an original Rx signal is circulated further to any one of the second circulator port 122 and the fourth circulator port 124.

The microwave filter arrangement 100 has a topology using a four-port circulator 120 and a matching termination impedance 170 connected to the first circulator port 121, opposite the fourth circulator port 124 that is connected to the antenna port 105. This provides a wide band match, seen from the antenna port 105 both inside and outside passbands of the filters 110, 112.

The principal is that the return loss seen from the antenna port 105 always will be good for a wide frequency band. A traditional topology will only provide good matching within the bandwidths of the transmitter filter 110 and the receiver filter 112. Outside these bandwidths, the filters 110, 112 will supply a relatively poor matching that in practice even may present more or less a total reflection. As an example, for a waveguide structure, the four-port circulator 120 will easily provide a RL (return loss) of 20 dB over the full waveguide bandwidth. That means seen from the antenna port 105 there will be a RL of 20 dB as well.

The topology of the microwave filter arrangement 100 according to the present disclosure will enable good matching in the antenna port 105 and therefore minimize the ripple in power at both the transmitter port Tx and the receiver port Rx. As the ripple is reduced, the accuracy of output and input power detectors will be improved. Furthermore, the signal quality will improve as the distortion cause on the signal due to slopes will be reduced. The microwave filter arrangement 100 according to the present disclosure will make it easier to combine transmitter units and receiver units since the interference will be reduced between the transmitter port Tx and the receiver port Rx.

According to some aspects, isolators 150, 152 can be used. In a traditional topology, isolators are placed close to amplifiers in radio units, since there may be issues with self-oscillations when the amplifiers experience poor matching. Today this is often overcome with good simulations tools.

Thereto, amplifiers can for example be balanced with a Lange coupler that will provide good matching even without isolators. In this example, the microwave filter arrangement 100 comprises a first isolator device 150 connected between the transmitter port Tx1 and the circulator device 120, a second isolator device 152 connected between the receiver port Rx and the circulator device 120. The first isolator device 150 is adapted to enable signals to mainly pass only towards the circulator device 120, and the second isolator device 152 is adapted to enable signals to mainly pass only towards the receiver port Rx.

The isolators 150, 152 are well-known components, for a waveguide structure, an isolator will provide an enhanced return loss and a reduced insertion loss over the full waveguide bandwidth.

The topology for a microwave filter arrangement 100 according to the present disclosure is very suitable to use when combining several branches together for a multi carrier radio. The combing could be done with a directional coupler but also power dividers like Wilkinson power dividers could be used as well. As all branches will have a wide band match over the band the matching seen from the antenna will be good on "all" frequencies.

In the following, two and three branches are illustrated, but of course any number of branches can be used.

In FIG. 3, there is a first microwave filter arrangement 100a with a first antenna port 105a, a first transmitter port Txa and a first receiver port Rxa. There is furthermore a second microwave filter arrangement 100b with a second antenna port 105b, a second transmitter port Txb and a second receiver port Rxb. The antenna ports 105a, 105b are connected to a first directional coupler 172 that in turn is connected to the antenna device 160 via a first total antenna port 205. The microwave filter arrangements 100a, 100b, the first directional coupler 172, and the first total antenna port 205 form a first total microwave filter arrangement 200.

Figure 4:
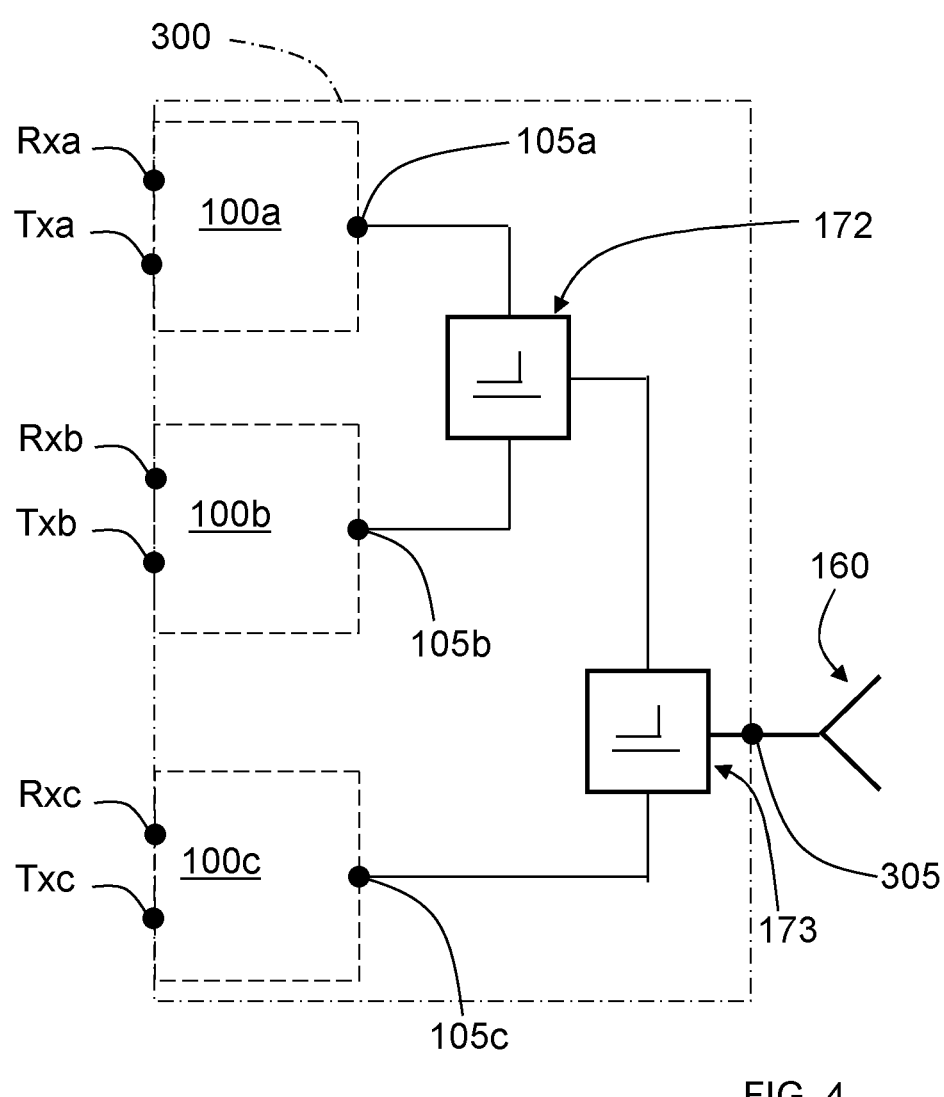
FIG. 4 schematically shows an arrangement with three microwave filter arrangement according to FIG. 2.

In FIG. 4, the antenna ports 105a, 105b are connected to the first directional coupler 172 that in turn is connected to a second directional coupler 173. There is also a third microwave filter arrangement 100c with a third antenna port 105c, a third transmitter port Txc, and a third receiver port Rxc. The third antenna port 105c is also connected to the second directional coupler 173, where the second directional coupler 172 in turn is connected to the antenna device 160 via a second total antenna port 205. The microwave filter arrangements 100a, 100b, 100c, the directional couplers 172, 173 and the second total antenna port 305 form a second total microwave filter arrangement 300.

Generally, with reference to both FIG. 3 and FIG. 4, there is a total microwave filter arrangement 200, 300 that comprises two or more microwave filter arrangements 100a, 100b, 100c according to the above, at least one connecting element 172, 173 and a total antenna port 205, 305. The two or more microwave filter arrangements 100a, 100b, 100c are connected to the total antenna port 205 via at least one connecting element 172, 173.

According to some aspects, each connecting element 172, 173 is a directional coupler.

Figure 5:
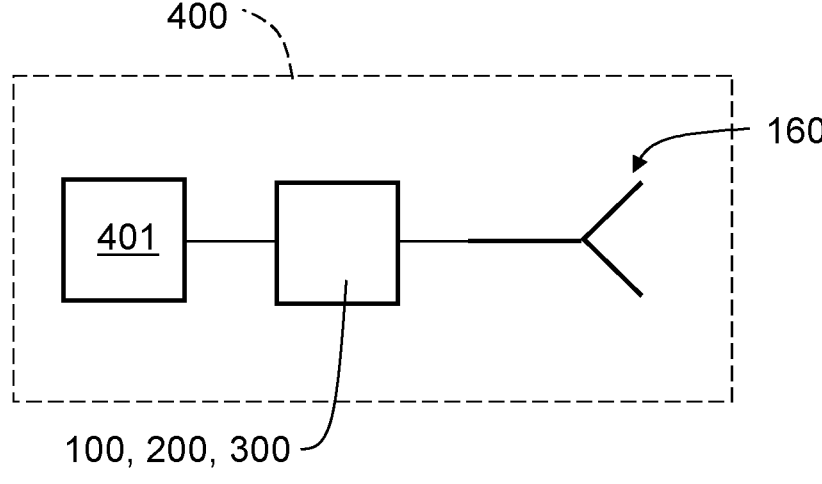
FIG. 5 schematically shows a microwave link transceiver arrangement comprising the microwave filter arrangement.

With reference to FIG. 5, the present disclosure also relates to a microwave link transceiver arrangement 400 comprising at least one microwave filter arrangement 100, 200, 300 according to the above, an antenna device 160 and a radio unit 401, where the microwave filter arrangement 100, 200, 300 is connected between the antenna device 160 and the radio unit 401. The radio unit 401 comprises a receiver device 181 and a transmitter device 180 as illustrated in FIG. 2, and can be constituted by a so-called TRX device. In FIG. 5, the microwave filter arrangement may be constituted by a single microwave filter arrangement 100 as illustrated in FIG. 2, or by two or more microwave filter arrangements 100a, 100b, 100c in a total microwave filter arrangement 200, 300 as illustrated in FIG. 3 and FIG. 4.

Figure 6:
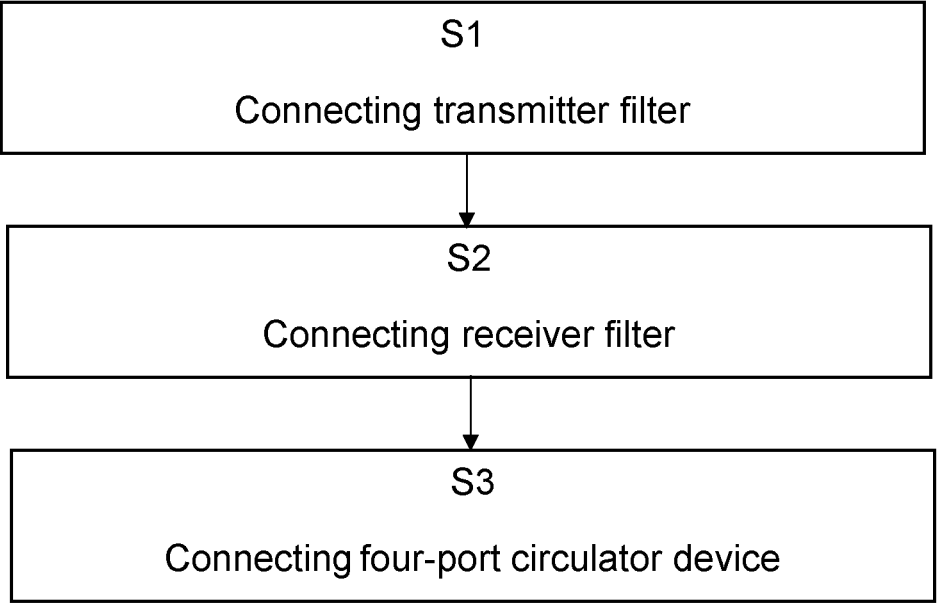
FIG. 6 illustrates methods according to the present disclosure.

With reference to FIG. 6, the present disclosure also relates to a method of configuring a microwave filter arrangement 100 comprising a first transmitter port Tx1, a receiver port Rx and an antenna port 105. The method comprises connecting S1 a transmitter filter 110 to the first transmitter port Tx1, and connecting S2 a receiver filter 112 to the receiver port Rx. The method further comprises connecting S3 a four-port circulator device 120 between the filters 110, 112, the antenna port 105 and a termination impedance 170 that is connected to ground 171. The circulator device 120 is used for admitting signals to pass from the transmitter filter 110 to the antenna port 105, from the antenna port 105 to the termination impedance 170, and from the antenna port 105 to the receiver filter 112.

The present disclosure is not limited to the examples discussed above, but may vary freely within the scope of the appended claims. The microwave filter arrangement 100 is generally constituted by an electrical filter arrangement 100 that can be applicable for any electrical application such as Radio Frequency (RF), microwave, and/or High Frequency signals. The microwave/electrical filter arrangement 100 can be realized in any suitable technology, or combination of technologies, such as for example waveguide technology, microstrip technology, coaxial technology and/or LTCC (Low Temperature Co-fired Ceramics) technology.

The invention claimed is:

1. A total electrical filter arrangement that comprises two or more electrical filter arrangements comprising:

a first electrical filter arrangement comprising:

a first transmitter port, a first receiver port a first antenna port, and a first transmitter filter connected to the first transmitter port, a first receiver filter connected to the first receiver port, and a first four-port circulator device that is connected between the first transmitter filter and the first receiver filter, the first antenna port, and a first termination impedance that is connected to a first ground, wherein the first four-port circulator device is adapted to admit signals to pass i) from the first transmitter filter to the first antenna port, ii) from the first antenna port to the first receiver filter, and iii) from the first receiver filter to the first termination impedance; and a second electrical filter arrangement comprising:

a second transmitter port, a second receiver port and a second antenna port, a second transmitter filter connected to the second transmitter port and a second receiver filter connected to the second receiver port, a second four-port circulator device that is connected between the second transmitter filter and the second receiver filter, the second antenna port, and a second termination impedance that is connected to a second ground, wherein the second four-port circulator device is adapted to admit signals to pass i) from the second transmitter filter to the second antenna port, ii) from the second antenna port to the second receiver filter, and iii) from the second receiver filter to the second termination impedance; and at least one directional coupler and a total antenna port, the at least one directional coupler connecting the first electrical filter arrangement and the second electrical filter arrangement to the total antenna port.

2. The total electrical filter arrangement according to claim 1, wherein the first four-port circulator device comprises a first circulator port that is connected to the first termination impedance, a second circulator port that is connected to the first transmitter filter, a third circulator port that is connected to the first receiver filter, and a fourth circulator port that is connected to the first antenna port, wherein signals input at the second circulator port mainly pass only via the fourth circulator port, wherein signals input at the fourth circulator port mainly pass only via the third circulator port, and wherein signals input at the third circulator port mainly pass only via the first circulator port.

3. The total electrical filter arrangement according claim 1, wherein the first termination impedance is a matched impedance.

4. The total electrical filter arrangement according to claim 1, further comprising:

a first isolator device connected between the first transmitter port and the first four-port circulator device; and a second isolator device connected between the first receiver port and the first four-port circulator device, wherein the first isolator device is adapted to enable signals to mainly pass only towards the first four-port circulator device, wherein the second isolator device is adapted to enable signals to mainly pass only towards the first receiver port.

5. The total electrical filter arrangement according to claim 1, wherein the two or more electrical filter arrangements are connected to the total antenna port via at least one connecting element.

6. The total electrical filter arrangement according to claim 5, wherein the at least one connecting element is the at least one directional coupler.

7. A microwave link transceiver arrangement comprising the total electrical filter arrangement according to claim 1, an antenna device and a radio unit, wherein the total electrical filter arrangement is connected between the antenna device and the radio unit.

8. The total electrical filter arrangement according claim 1, further comprising:

a third electrical filter arrangement comprising:

a third transmitter port, a third receiver port and a third antenna port, a third transmitter filter connected to the third transmitter port and a third receiver filter connected to the third receiver port, a third four-port circulator device that is connected between the third transmitter filter and the third receiver filter, the third antenna port, and a third termination impedance that is connected to a third ground, wherein the third four-port circulator device is adapted to admit signals to pass i) from the third transmitter filter to the third antenna port, ii) from the third antenna port to the third receiver filter, and iii) from the third receiver filter to the third termination impedance; and at least a second directional coupler, the at least the second directional coupler connecting the at least one directional coupler and the third electrical filter arrangement to the total antenna port.

9. The total electrical filter arrangement according claim 1, further comprising a connection to a radio unit, the radio unit comprising a receiver device and a transmitter device.

10. A method of configuring a total electrical filter arrangement that comprises two or more electrical filter arrangements comprising a first transmitter port, a first receiver port and a first antenna port, a second transmitter port, a second receiver port and a second antenna port the method comprising:

connecting a first transmitter filter to the first transmitter port;

connecting a first receiver filter to the first receiver port;

connecting a first four-port circulator device between the first transmitter filter and the first receiver filter, the first antenna port and a first termination impedance that is connected to a first ground;

connecting a second transmitter filter to the second transmitter port;

connecting a second receiver filter to the second receiver port;

connecting a second four-port circulator device between the second transmitter filter and the second receiver filter, the second antenna port and a second termination impedance that is connected to a second ground; and connecting the first antenna port and the second antenna port to at least one directional coupler, the at least one directional coupler connected to a total antenna port, wherein:

the first four-port circulator device is used for admitting signals to pass i) from the first transmitter filter to the first antenna port, ii) from the first antenna port to the first termination impedance, and iii) from the first antenna port to the first receiver filter; and the second four-port circulator device is used for admitting signals to pass iv) from the second transmitter filter to the second antenna port, v) from the second antenna port to the second termination impedance, and vi) from the second antenna port to the second receiver filter.

* * * * *